3,325,540
PERHALOGENATED ALKANOYL CHLORIDES
AND THEIR PREPARATION
Louis G. Anello, Basking Ridge, and Richard F. Sweeney, Randolph Township, N.J., assignors to Allied Chemical Corporation, New York, N.Y., a corporation of New York
No Drawing. Filed Dec. 4, 1964, Ser. No. 416,155
14 Claims. (Cl. 260—544)

This invention relates to the production of a novel class of perhalogenated alkanoyl chlorides and to a method for preparing the same.

These compounds have utility as solvents and sealing adjuvants for films of polymers, terpolymers and copolymers of trifluorochloroethylene.

An object of this invention is to provide a novel class of chemical compounds and more particularly to provide a class of perhalogenated pentanoyl and hexanoyl chlorides, the halogen atoms being fluorine or chlorine, there being a minimum of 2 fluorine atoms and 6 chlorine atoms present in the molecule.

Another object of the invention is to provide a novel process for the production of perhalogenated pentanoyl and hexanoyl chlorides, the halogen atoms being fluorine or chlorine, there being a minimum of 2 fluorine atoms and 6 chlorine atoms present in the molecule.

Other objects and advantages will be apparent from the following description and discussion of the subject invention.

In accordance with the invention, a novel class of chemical compounds is produced by chlorinating a dichloroperhalogenated cycloalkenone, wherein two chlorine atoms are vicinally attached to the unsaturated carbon atoms of the double bond, at high temperatures and in the presence of actinic radiation. The class of starting materials which may be employed may be represented by the following formula:

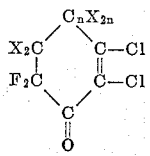

wherein X may be F or Cl and $n$ may be 0 or 1. By this chlorination procedure a novel class of perhalogenated alkanoyl chlorides is produced, having the formula:

$$CF_2ClCX_2(CX_2)_nCCl_2CCl_2COCl$$

wherein X and $n$ are as defined above.

The reaction may be specifically illustrated by the following reaction of 2,3-dichlorohexafluoro-2-cyclohexenone with chlorine to produce 2,2,3,3,6-pentachlorohexafluorohexanoyl chloride:

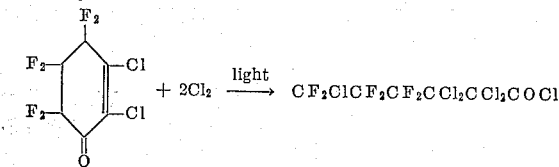

It can be seen that one chlorine atom adds on to each of the unsaturated carbon atoms of the cycloalkenone starting material and also adds on to the terminal carbon atoms of the aliphatic chain which results when the cyclic ketone structure ruptures.

This result is obtained substantially only at relatively high temperatures, generally above about 130° C. At temperatures in the neighborhood of 130° C., the corresponding perhalogenated cycloalkanone is produced as by-product, as disclosed and claimed in co-pending, commonly assigned application of Louis G. Anello and Richard F. Sweeney, Ser. No. 381,229, filed July 8, 1964, now abandoned, and co-pending, commonly assigned continuation-in-part application thereof, of Louis G. Anello and Richard F. Sweeney, Ser. No. 420,154, filed Dec. 21, 1964. Although the starting materials and basic reaction procedures are essentially the same in both processes, it has been discovered that by use of reaction temperatures of above about 150° C., the character of the reaction is shifted to the aliphatic alkanoyl chloride product, nearly exclusively of the coresponding perhalogenated cycloalkanone product, as contrasted with a shift of the character of the reaction to the latter product, at temperatures below about 130° C. Thus, insofar as operating temperatures are concerned, in order to minimize production of the above-described competing by-product, temperatures during the reaction should be maintained between about 150–180° C. It has been found that optimum yields are obtained when the reaction temperatures are maintained within the range of about 180–190° C. Sought-for product may be obtained at temperatures above about 190° C., however, without any particular advantage in operating at elevated temperatures of that order. Product will also be obtained in decreasing amounts, for the above-described reasons, at temperatures down to about 130° C. and below.

Where the corresponding perhalogenated pentanoyl chlorides are desired, the corresponding dichloro-perhalogenated cyclopentenone is employed and the reaction proceeds substantially in the same way.

The reaction of the invention can be carried out in an ordinary Pyrex vessel, although a higher photon efficiency can be obtained if a vessel made of quartz or "Vycor" glass is used. The reaction vessel can be optionally equipped with a gas inlet dip tube, a condenser, a stirrer, a thermometer and heating or cooling means.

The dichloro-perhalogenated cycloalkenone starting materials are normally liquids at room temperature and may be prepared by reacting the corresponding dichloro-perhalogenated cycloalkene with sulfur trioxide in the presence of a boron or pentavalent antimony compound catalyst at 0° to 100° C. as disclosed and claimed in co-pending, commonly assigned application, Ser. No. 373,058, filed June 5, 1964.

The chlorine flow rate is not critical in the subject reaction. In operation, chlorine is passed in at such a rate as to permit complete reaction.

The overall ratio of chlorine reactant to ketone starting material is at least 2:1 moles of chlorine per mole of ketone. This is the minimum stoichiometric amount of chlorine required for complete reaction. Generally, a slight excess of chlorine, for example a 10% excess, is used to insure complete reaction. The presence of greater excess of chlorine has no detrimental effect on the reaction but does not increase the yield.

Simultaneously with the passing of the chlorine gas through the ketone, the reaction mixture must be exposed to actinic radiation. Actinic radiation may be defined as the action of any light which effects chemical change. Thus, any form of light which effects chemical reaction may be employed, such as ordinary sunlight, ultraviolet light, commercial incandescent light and fluorescent light. The preferred form of light is ultraviolet which can conveniently be provided by any commercial mercury arc lamp or sun lamp. It has been found that a commercial high pressure mercury arc lamp enclosed in a Vycor water jacket, which lamp is maintained at a distance of 1 to 3 inches from the reaction vessel, affords a particularly good temperature control although the intensity of the light used is not critical in the subject invention. As a general rule, the speed of the reaction will be directly proportional to the intensity of light employed.

Although the process can be carried out under either atmospheric, subatmospheric or superatmospheric pressure, atmospheric pressure is preferable and most practical. The atmosphere is desirably devoid of air or oxygen which can be swept out by the chlorine gas or can be initially removed from the reaction vessel by purging with an inert gas, such as nitrogen.

Completion of the reaction is indicated when the reaction product shows loss of unsaturation as determined by the disappearance of the carbon to carbon double bond absorption band at 6.3 microns in the infrared.

The products, which are liquids, are typically removed from the reaction mixture after completion of the reaction, by distillation.

The preferred mode of carrying out the reaction of the invention is as follows: One of the ketone starting materials is introduced into the described reaction vessel. The chlorine gas is then passed through the ketone initiating the reaction, which is exothermic. The reaction temperature is then controlled so that it is maintained within the above-descrbed optimum reacton temperature ranges. This may be accomplished simply by regulation of chlorine flow rate to control exotherm, by removal of the heat of reaction, by any conventional heating or cooling means, or by any combination of the above.

As illustrative of the scope and intendment of the invention, the following represents a partial listing of the novel compounds falling within the scope of the invention; it being understood that this listing is for illustrative purposes only, said listing not being all inclusive and the inventors not being limited thereby, but only by the scope of the invention as defined in the appended claims:

2,2,3,3,6-pentachlorohexafluorohexanoyl chloride
2,2,3,3,4,4,5,5,6-nonachlorodifluorohexanoyl chloride
2,2,3,3,5,5,6-heptachlorotetrafluorohexanoyl chloride
2,2,3,3,5-pentachlorotetrafluoropentanoyl chloride
2,2,3,3,4,5-hexachlorotrifluoropentanoyl chloride
2,2,3,3,5,5,5-heptachlorodifluoropentanoyl chloride The following examples will serve to further illustrate the objects and practice of the present invention. Parts and percentages are by weight unless otherwise stated.

EXAMPLE 1

A 500 ml. 3-neck, pear-shaped, Pyrex flask, equipped with a gas inlet dip tube, a stirrer, a thermometer and a condenser was charged with 60 g. (0.22 mole) of 2,3-dichlorohexafluoro-2-cyclohexenone. Chlorine was passed into the flask via the dip tube over a period of 48 hours during which time the contents were irradiated with a General Electric (RS) Sun Lamp (250 watts). The sun lamp was positioned 3 inches from the flask. During this period, the reaction temperature rose to 140° C. and then to 190° C. A total of 63 g. of organic product was recovered from the reaction flask. Upon distillation this material gave the following fractions:

| Fraction | Temperature Range (° C.) | Wt., g. |
| --- | --- | --- |
| 1 | 135–136 | 30 |
| 2 | 136/760 mm.–84/4 mm | 16 |
| 3 | 84/4 mm | 17 |

Infrared analysis of fraction 1 showed that it consisted essentially of 2,3-dichlorohexafluoro-2-cyclohexenone. Infrared analysis of fraction 2 showed that it contained a mixture of 2,3-dichlorohexafluoro-2-cyclohexenone starting material and the sought-for product 2,2,3,3,6-pentachlorohexafluorohexanoyl chloride. Fraction 3 consisted of 2,2,3,3,6-pentachlorohexafluorohexanoyl chloride which was a liquid at room temperature having a boiling point of 84° C./4 mm. Infrared spectrum analysis showed that this material had major absorption peaks at: 5.55, 7.8, 8.1, 8.3, 8.45, 8.65, 8.75, 9.1, 9.75, 10.25, 10.4, 10.8, 11.2, 11.5, 12.5, 12.95, 13.6 and 14.00 microns.

*Analysis.*— Calculated for $C_6Cl_6F_6O$: Cl, 51.2%; F, 27.5%. Found: Cl, 49.1%; F, 28.3%.

EXAMPLE 2

The process of Example 1 is repeated excepting that a starting material comprising 2,3-dichlorotetrafluoro-2-cyclopentenone is charged to the reaction flask. The product obtained is 2,2,3,3,5-pentachlorotetrafluoropentanoyl chloride.

EXAMPLE 3

The procedure described in Example 1 is repeated, excepting that the starting material is replaced successively with each of the materials listed in the first column of Table 1. The product obtained is listed oppositely in the second column.

Table I

| | |
| --- | --- |
| 2,3,4,4,5,5-hexachlorodifluoro-2-cyclohexenone. | 2,2,3,3,4,4,5,5,6-nonachlorodifluorohexanoyl chloride. |
| 2,3,5,5-tetrachlorotetrafluoro-2-cyclohexenone. | 2,2,3,3,5,5,6-heptachlorotetrafluorohexanoyl chloride. |
| 2,3,6,6-tetrachlorotetrafluoro-2-cyclohexenone. | 2,2,3,3,6,6,6-heptachlorotetrafluorohexanoyl chloride. |
| 2,3,4-trichlorotrifluoro-2-cyclopentenone. | 2,2,3,3,4,5-hexachlorotrifluoropentanoyl chloride. |
| 2,3,5,5-tetrachlorodifluoro-2-cyclopentenone. | 2,2,3,3,5,5,5-heptachlorodifluoropentanoyl chloride. |

EXAMPLE 4

2,2,3,3,6-pentachlorohexafluorohexanoyl chloride, hereinafter referred to as alkanoyl chloride, was tested as a sealing adjuvant for thermoplastic film composed of a copolymer of about 96% trifluorochloroethylene and about 4% vinylidene fluoride. A saturated solution of this polymer in the alkanoyl chloride was prepared by refluxing the latter with said polymer, cooling the resulting mixture to room temperature and decanting the solution from the undissolved polymer. Two strips of the polymer film were sealed together without the use of sealing adjuvant. Two more strips of the polymer film were sealed together, this time employing as sealing adjuvant the above-described solution of the polymer in the alkanoyl chloride. The solution was applied as sealing adjuvant by merely coating, as by brushing, the inner surfaces of the film strips to be sealed. In all cases, an impulse heat sealer was used. The impulse heat sealer was a Sentinel Impulse manufactured by Packaging Industries, Inc., of Montclair, N.J. The sealing pressure was 30 p.s.i. The heat sealing temperature was 400° F. The dwell time for the seal, or in other words the length of time during which the pressure and heat were applied to effect the seal, was three (3) seconds. It was attempted to test the seal strength by measuring the amount of force needed to rupture or pull apart the seal. The sealing adjuvant solution, however, apparently affected the strength of the polymer film in the vicinity of the seal, for the polymer film ruptured before the seal, at a point away from the sealing area. As can be seen from the following Table II, the polymer film strips sealed with the adjuvant solution, ruptured at a weight considerably higher than the film strips which were not so treated.

Table II

Wt. to effect rupture, g.

Film strips heat-sealed without the use of sealing adjuvant _____ 345
Films heat-sealed with a polymer solution in 2,2,3,3,6-pentachlorohexafluorohexanoyl chloride _____ >2287

EXAMPLE 5

When the alkanoyl chloride products listed in the second column of Table I of Example 3 are used as sealing adjuvant solutions in the manner described in Example 4, substantially the same results are obtained. That is to say, pairs of polymer film strips, which are sealed together with the various alkanoyl chloride product-polymer sealing adjuvant solutions, rupture at weights considerably higher than pairs of film strips which are sealed together without the use of such sealing adjuvant solutions.

Mixtures of the subject compounds may also be employed as sealing adjuvants, with advantageous results. Although a copolymer of about 96% trifluorochloroethylene and about 4% vinylidene fluoride was employed, a wide variety of polymers, terpolymers and copolymers of trifluorochloroethylene may be employed with equivalent results; homopolymeric trifluorochloroethylene and copolymers of trifluorochloroethylene with vinyl chloride, 1,1-chlorofluoroethylene, trifluoroethylene and perfluorobutadiene being exemplary. In general, most suitable are those compositions containing upwards of 50% by weight of trifluorochloroethylene. The general class of compositions described above can be referred to generically as polytrifluorochloroethylene.

We claim:

1. Perhalogenated alkanoyl chlorides of the formula:

$$CF_2ClCX_2(CX_2)_nCCl_2CCl_2COCl$$

wherein X may be F or Cl and $n$ may be 0 or 1.

2. Perhalogenated alkanoyl chlorides as defined in claim 1 wherein $n$ is 0.
3. Perhalogenated alkanoyl chlorides as defined in claim 1 wherein $n$ is 1.
4. 2,2,3,3,6-pentachlorohexafluorohexanoyl chloride.
5. 2,2,3,3,5-pentachlorotetrafluoropentanoyl chloride.
6. A process for the preparation of perhalogenated alkanoyl chlorides which comprises chlorinating a dichloroperhalocycloalkenone having the following characteristics:
    (a) the halogen atoms are independently selected from the group consisting of chlorine and fluorine,
    (b) the double bond is in alpha position with respect to the carbonyl group,
    (c) two chlorine atoms are vicinally attached to the unsaturated carbon atoms of the double bond,
    (d) two fluorine atoms are attached to the saturated carbon atom which is in alpha position with respect to the carbonyl group;
in the presence of actinic radiation.

7. The process of claim 6 in which reaction temperatures are maintained above about 130° C.
8. The process for preparing compounds of the formula:

$$CF_2ClCX_2(CX_2)_nCCl_2CCl_2COCl$$

wherein X may be F or Cl and $n$ may be 0 or 1, which comprises chlorinating a compound of the formula:

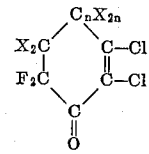

wherein X and $n$ are as defined above, in the presence of actinic radiation.

9. The process of claim 8 wherein reaction temperatures are maintained above about 150° C.
10. The process of claim 9 wherein $n$ is 1.
11. The process of claim 9 wherein $n$ is 0.
12. A process for the preparation of 2,2,3,3,6-pentachlorohexafluorohexanoyl chloride which comprises chlorinating 2,3-dichlorohexafluoro-2-cyclohexenone in the presence of actinic radiation and at temperatures above about 130° C.
13. The process of claim 12 wherein reaction temperatures are maintained above about 150° C.
14. The process of claim 12 wherein reaction temperatures are maintained substantially in the range of about 180–190° C.

No references cited.

LORRAINE A. WEINBERGER, *Primary Examiner.*
RICHARD K. JACKSON, *Examiner.*